United States Patent
Ospanov et al.

(10) Patent No.: US 9,834,826 B2
(45) Date of Patent: Dec. 5, 2017

(54) METHOD FOR EXTRACTING BERYLLIUM FROM BERTRANDITE AND PHENAKITE MINERAL GROUPS

(71) Applicants: Habibulla Kusainovich Ospanov, Almaty (KZ); Galymkair Mutanovich Mutanov, Almaty (KZ); Nazira Habibyllakyzy Ospanova, Almaty (KZ); Aishagul Batyrbekovna Baiboldieva, Almaty (KZ)

(72) Inventors: Habibulla Kusainovich Ospanov, Almaty (KZ); Galymkair Mutanovich Mutanov, Almaty (KZ); Nazira Habibyllakyzy Ospanova, Almaty (KZ); Aishagul Batyrbekovna Baiboldieva, Almaty (KZ)

(73) Assignee: AL-FARABI KAZAKH NATIONAL UNIVERSITY, Almaty (KZ)

( * ) Notice: Subject to any disclaimer, the term of this patent is extended or adjusted under 35 U.S.C. 154(b) by 0 days.

(21) Appl. No.: 15/382,956

(22) Filed: Dec. 19, 2016

(65) Prior Publication Data

US 2017/0107596 A1    Apr. 20, 2017

Related U.S. Application Data

(63) Continuation-in-part of application No. 14/574,751, filed on Dec. 18, 2014, which is a continuation-in-part of application No. 13/864,385, filed on Apr. 17, 2013, now Pat. No. 8,945,492, and a continuation-in-part of application No. 13/864,399, filed on Apr. 17, 2013, now Pat. No. 8,945,493.

(51) Int. Cl.
| | |
|---|---|
| *C22B 35/00* | (2006.01) |
| *C01F 3/00* | (2006.01) |
| *C22B 3/10* | (2006.01) |
| *C22B 3/22* | (2006.01) |

(52) U.S. Cl.
CPC ............ *C22B 35/00* (2013.01); *C01F 3/00* (2013.01); *C22B 3/10* (2013.01); *C22B 3/22* (2013.01)

(58) Field of Classification Search
None
See application file for complete search history.

(56) References Cited

U.S. PATENT DOCUMENTS

| | | | | |
|---|---|---|---|---|
| 2,162,323 A | * | 6/1939 | Wille | C01F 3/005 423/126 |
| 3,177,068 A | * | 4/1965 | Mod | C22B 35/00 423/127 |
| 3,699,208 A | * | 10/1972 | Grunig | C22B 35/00 423/116 |
| 3,704,091 A | * | 11/1972 | Grunig | C22B 35/00 423/128 |

FOREIGN PATENT DOCUMENTS

AU          2173788 A   *   3/1989

\* cited by examiner

*Primary Examiner* — Melissa S Swain
(74) *Attorney, Agent, or Firm* — Nadya Reingand; Yan Hankin

(57) ABSTRACT

The present invention discloses methods for leaching beryllium from a beryllium-containing concentrate or a beryllium-containing ore, comprising contacting the concentrate or the ore with a leaching solution, wherein the leaching solution contains a technical grade hydrochloric acid, wherein the solution contains no sulfuric acid, no nitric acid, and no potassium chlorate, extracting beryllium via a gradual heating process, wherein the technical grade hydrochloric acid is used in varying amounts by volume per liter of leaching solution, and adding ammonium fluoride to the leaching solution in contact with the concentrate or ore, wherein the ammonium fluoride is added in a fractional manner.

9 Claims, No Drawings

METHOD FOR EXTRACTING BERYLLIUM FROM BERTRANDITE AND PHENAKITE MINERAL GROUPS

CROSS-REFERENCE TO RELATED APPLICATIONS

This patent application is a Continuation-in-Part of U.S. patent application Ser. No. 14/574,751, filed Dec. 18, 2014, which is a Continuation-in-Part of U.S. patent application Ser. No. 13/864,385, now U.S. Pat. No. 8,945,492, filed on Apr. 17, 2013, as well as U.S. patent application Ser. No. 13/864,399, now U.S. Pat. No. 8,945,493, filed on Apr. 17, 2013. This patent application also claims priority to the Patent Application of Kazakhstan, No. 2013/1925.1, filed on Dec. 23, 2013.

FIELD OF INVENTION

The invention relates to the non-ferrous metallurgy industry and can be used to extract beryllium from bertrandite and phenakite groups under the conditions of processing mineral raw materials (ores, concentrates via heap, vat leaching).

BACKGROUND

The object of the invention is to develop a method for extracting beryllium from bertrandite (Be4(Si2O8)(OH)2)} and phenakite (Be2(SiC4)) groups that permits expanding the range of mineral raw materials that can be included in processing and provides an economical and more environmentally friendly production due to the use of effective active reagent at low-temperature modes of the hydrochemical method.

Modern methods for extracting beryllium from the aforementioned mineral in part from ore and concentrates is performed only by the pyrometallurgical method at a high temperature.

The disadvantages of pyrometallurgical production of beryllium extraction are harmful toxic gas emission, high energy costs, the need for refractory materials, which are not beneficial either economically or ecologically (Everest D. Beryllium chemistry.—M.: Chemistry, 1968; Plyushchev E. P., Stepina S. V., Fedorov P. I. Chemistry and technology of rare and trace elements. Part 1./under ed. Bolipakova.—M.: Higher education institution, 1976.—p. 186-221; Silina G. F., Zarembo Y. I., Bertina L. E. Beryllium. Chemical technology and metallurgy/under ed. V. I. Spitsina.—M.: Atomizdat, 1960.—p. 20-35).

Replacing the high-temperature method of extracting beryllium from beryllium-containing raw materials represented primarily in the form of minerals: bertrandite (Be4 (Si2O8)(OH)2)} and phenakite (Be2(SiC4)) concentrates with a cheaper hydrochemical method using effective solvents is highly pressing.

The object of the invention is to develop a novel method for extracting beryllium from bertrandite and phenakite, which permits expanding the range of raw minerals used for processing and provides more economical production and improved environmental impact via use of an effective active reagent at low temperatures by hydrochemical method, which has no analogues in worldwide application.

A technical solution relatively similar to the invention is the method for dissolving bertrandite-phenakite concentrate via processing it using a sulfate method (a variant of Brush-Beryllium method) after thermal processing with an 85% concentrated sulfuric acid at a temperature of 300° C. in thermostabilized conditions (UMF, City of Ust-Kamenogorsk) (Plyushchev E. P., Stepina S. V., Fedorov P. I. Chemistry and technology of rare and trace elements. Part 1./under ed. Bolipakova.—M.: Higher education institution, 1976.—p. 186-221). A disadvantage of the known method is compliance with safety regulations and complexity of the process of breaking down sulfuric acid.

Even closer in essence is our previously proposed novel method for extracting beryllium from beryllium concentrate containing mainly bertrandite and phenakite minerals using an extremely hard-to-access, expensive, and toxic reagent with a hot solution of potassium bifluoride (KNF2) in the presence of HCl:H2O=1:1 during continuous heating up to 80° C. for a duration of 8 hours.

In relation to the aforementioned, in order to eliminate the above-mentioned disadvantages it is essential to find a cheaper, less toxic, and effective active reagent-solvent for beryllium minerals, which can successfully replace potassium bifluoride during hydrometallurgical processing of beryllium-containing raw materials.

SUMMARY OF THE INVENTION

The present invention discloses methods for leaching beryllium from a beryllium-containing concentrate or a beryllium-containing ore, comprising the following steps: (1) contacting the concentrate or the ore with a leaching solution, said leaching solution containing a technical grade hydrochloric acid, said solution containing no sulfuric acid, no nitric acid, and no potassium chlorate, (2) extracting beryllium via a gradual heating for 8 hours from 25° to 80° C., wherein the technical grade hydrochloric acid is used in amounts from 0.2-12% by volume per liter of leaching solution, and (3) adding ammonium fluoride to the leaching solution in contact with the concentrate or ore, wherein said ammonium fluoride is added in a fractional manner.

In some aspects, the invention comprises a method for dissolving a bertrandite-phenakite concentrate or a bertrandite-phenakite ore, the method comprising the steps of: (1) processing the concentrate or ore with a solvent, (2) filtrating and washing the concentrate or ore, and (3) gradually heating the concentrate or ore with a solvent for up to 10 hours from 25° C. to up to 80° C., wherein the solvent comprises 12% by mass of hydrochloric acid in a presence of ammonium fluoride, said ammonium fluoride being fractionally added to a concentration of 8% solution by mass.

In some aspects, the leaching solution comprises equal parts HCl and $H_2O$.

In some aspects, the heating step comprises heating to a temperature of 55 degrees Celsius.

In some aspects, the method for leaching beryllium from a beryllium-containing concentrate or an ore, consists essentially of the following steps: (1) contacting the concentrate or the ore with a leaching solution consisting essentially of technical grade hydrochloric acid, and (2) extracting beryllium via a gradual heating from a temperature of 25 degrees Celsius to 80 degrees Celsius.

In some aspects, the method further comprises adding ammonium fluoride (NH4F) to the leaching solution, wherein said NH4F is added in a fractional manner.

In some aspects, the heating occurs for 8-10 hours.

In some aspects, the temperature is gradually increased from 25 to 55 degrees Celsius.

DETAILED DESCRIPTION OF THE PREFERRED EMBODIMENT

Definitions

"Technical grade hydrochloric acid (HCl)," as used herein, is defined as the following: In accordance with GOST 3118-77, the hydrochloric acid used in the present invention must comply with the following guidelines:

Mass fraction of residue after ignition (in the form of sulfate (SO4), not more than 0.0005%;
Mass fraction of sulfites (SO3), not more than 0.0002%;
Mass fraction of sulfate (SO4), not more than 0.0002%;
Mass fraction of free chlorine, not more than 0.00005%;
Mass fraction of ammonium salts, no more than 0.0003%;
Mass fraction of iron, not more than 0.00005%;
Mass fraction of arsenic, not more than 0.000005%;
Mass fraction of heavy metals, not more than 0.00005%.

"Technical grade" also corresponds to the classification of chemicals, Purissimum (puriss.).

The object of the invention is developing a method for extracting beryllium from bertrandite (Be4(Si2O8)(OH)2)} and phenakite (Be2(SiC4)) groups, which permits expanding the range of raw minerals used for processing and provides more economical production and improved environmental impact via use of an effective active reagent at low temperatures by hydrochemical method, which has no analogues in worldwide application.

Due to this, additional studies were conducted to develop more effective and cheaper methods of extracting beryllium from bertrandite and phenakite groups under the conditions of processing mineral raw materials (ore, concentrate).

Leaching beryllium-containing raw material from beryllium minerals from bertrandite and phenakite groups is performed by contacting monomineral samples, ore or concentrate, with leaching agents: hydrochloric acid and water (1:1), in the absence as well as presence of ammonium fluoride in the range of 1-8 g in hydrochloric acid medium followed by beryllium extraction using 0.5 liters of solution within a hydrochloric acid range between 2 to 12% in the presence of the above-mentioned reagent at S:L=1:5 while steadily heating over the course of 8-10 hours at a heating temperature of 25°-80° C.

The effective action of solvents, as complexing agents as well as oxidizing agents, depends on the pH of the solution. Therefore, the choice of hydrochloric acid as the medium and dissolving reagent (solvent) is due to the hydrochloric acid, acting as a acid reagent, also simultaneously performs the functions of a complexing reagent, i.e. supplier of chloride ions into the reaction medium for bonding metal ions in the compound. This is the main advantage of hydrochloric acid compared to the widely-used sulfuric acid. In the case of using sulfuric acid in practice the transfer of beryllium ions from the solid phase into the solution sharply decreases due to the blocking of surface minerals containing the aforementioned metals, formed by low-solubility sulfates of associated metals, such as calcium, barium, lead, and magnesium.

Using hydrochloric and chloride methods for leaching beryllium ions is based on the high solubility of the resulting complex chlorides.

The role of hydrochloric acid can be summarized in that is not only inhibits hydrolysis, but also forms stable bonding of BeCl (Everest D. Beryllium chemistry.—M.: Chemistry, 1968; Plyushchev E. P., Stepina S. V., Fedorov P. I. Chemistry and technology of rare and trace elements. Part 1./under ed. Bolipakova.—M.: Higher education institution, 1976.— p. 186-221; Silina G. F., Zarembo Y. I., Bertina L. E. Beryllium. Chemical technology and metallurgy/under ed. V. I. Spitsina.—M.: Atomizdat, 1960.—p. 20-35).

We carried out initial experimental studies on dissolution only in hydrochloric acid with consequent heating of the reaction mixture from 25 to 80° C. of monomineral samples of the above-mentioned beryllium-containing minerals (mineral purity: bertrandite—98.5, phenakite—98.3). Verification of the data on monomineral samples of beitiandite and phenakite under conditions of a hydrochloric acid concentration of 0.8 to 12% (by mass) has shown that at a hydrochloric acid concentration of 0.8% no more than 5% of beryllium was extracted from bertrandite and 2% from phenakite (Table 1). Only increasing the concentration to 12% or more leads to almost complete dissolution.

Table 1—Beryllium extraction (in %) from bertrandite and phenakite groups depending on hydrochloric acid concentration. Minerals weighed 100 mg. Solution volume 200 mL Duration of 8 hours at continuous heating from 25° to 80° C.

TABLE 1

| Minerals | Hydrochloric acid concentration, % | | | | | |
|---|---|---|---|---|---|---|
| | .8 | .2 | .4 | .0 | .0 | 2.0 |
| | Beryllium extraction from minerals, % | | | | | |
| Bertrandite | | | 5 | 2 | 0 | 8 |
| Phenakite | .2 | 6 | 8 | 8 | 5 | |

Our preliminary experimental results of studying bertrandite, phenakite behavior depending on hydrochloric acid concentration allowed us to obtain information regarding primary factors that influence the process being studied: hydrochloric acid concentration, duration of mixing, temperature.

With the goal of finding more effective variants of optimal conditions for complete dissolution of bertrandite and phenakite, an orthogonal experiment design of the 2nd order with "axial distance" $\alpha = \pm 1,215$ was used.

The ratio of components, including the concentration of hydrochloric acid used during leaching, was experimentally chosen using a multifactorial orthogonal experiment design method. Deviation from it leads to decreased level of beryllium extraction from beryllium-containing raw materials.

To confirm the obtained technical result of the proposed method, examples of implementation are provided: the experiment was performed in a 500 mL volume of leaching solution, respectively, with a ratio of S:L=1:5. The degree of extraction was determined using existing methods.

EXAMPLE 1

A 500 mL cold solution of technical hydrochloric acid of 12% concentration (by mass) was poured into a 0.500 g weighed portion of bertrandite and phenakite (separately) monominerals. The components were gradually heated from 25° C. to 80° C. for 8 hours. Results of the experiment are shown in Table 2.

EXAMPLE 2

The experiment is performed analogously to Example 1, but with a technical hydrochloric acid concentration value of 8% (by mass). Results are also shown in Table 2.

EXAMPLE 3

The experiment is performed analogously to Examples 1-2, but with a technical hydrochloric acid concentration value of 0.8% (by mass). Results are also shown in Table 2.

Table 2—Results of the multifactorial experiment using orthogonal design experiment of the 2nd order α=±1.215. Experiments were conducted separately for bertrandite and phenakite on the same planning matrix. Weighed portion 500 mg.

TABLE 2

| | | Test conditions: cold solution of hydrochloric acid of varying concentrations; with gradual heating from cold to 80° C. for 8 hours. Beryllium extraction in % | | |
|---|---|---|---|---|
| No | Beryllium minerals, % | Example 1 (12% HCl by mass) | Example 2 (8% HCl by mass) | Example 3 (0.8% HCl by mass) |
| 1 | Bertrandite | 98.0; 96.0; 97.0; | 81.0; 82.0; 80.5 | 5.7; 5.5; 5.2 |
| 2 | Phenakite | 95.0; 94.0; 94.5 | 78.0; 77.0; 76.8 | 2.0; 2.5; 2.3 |

Based on the experimental data (Table 2) obtained using the proposed method, the following optimal conditions for the most effective extraction of beryllium from bertrandite and phenakite were chosen: 500 mL of 12% cold hydrochloric acid solution by mass with gradual heating for 8 hours from 25° C. to 80° C. Under these conditions, the degree of beryllium extraction from bertrandite and phenakite was determined, and they are 97-98% and 94-95%, respectively. Use of a 12% cold solution of HCl:H2O—1:1 by mass with gradual heating from 25° C. to 80° C. for 8 hours is due to the fact using a hot solution creates a large quantity of silicic acid, which inhibits the process of dissolving beryllium minerals by blocking their surfaces. This leads to decreased beryllium extraction from bertrandite-phenakite concentrates. Previously, hot solutions of 1:1 hydrochloric acid was used for extracting beryllium from genthelvite groups (Innovative Patent RK No 26589, MRK COIF 1/00, C22B 35/00, publ. bulletin No 12 from 25 Dec. 2012). However, genthelvite groups have greater reactivity than bertrandite and phenakite groups (Ospanov K.K. General principles of prediction of differences of minerals and "solvents" reactivity in the processes of mineral raw materials processing (On materials of 3 international scientific discoveries. Student's book—Almaty: TOO <<BTS paper>>, 2012.—p 367).

The proposed method of extracting beryllium from bertrandite and phenakite mineral groups was also tested directly on bertrandite and phenakite concentrates provided by UMF (City of Ust Kamenogorsk) with initial content of 4.18%.

Extraction technique: 500 mL of cold hydrochloric solution of varying concentrations was poured on a weighed portion of 25 g of concentrate and gradually heated on the plate for 10 hours from a temperature of 25° C. to 80° C., since the object is bertrandite and phenakite concentrate. Cooled and filtered, the beryllium content was determined by physical method. It comprised 90-91%. Results are shown in Table 3.

Table 3—Results of validation of beryllium extraction from bertrandite-phenakite concentrate with initial content of 4.18%. Weighed portion of 25 g of concentrate. The volume of the solution is 500 mL of 12% hydrochloric acid by mass with gradual boiling from 25° C. to 80° C. for 8 hours. Results are the mean of 4 experiments.

TABLE 3

| Total content of Be in concentrate, in % by mass | Obtained value of Be from concentrate in % |
|---|---|
| 4.18 | 91.0; 90.5; 90.7; 90.8; 90.6; 91.0 |

During the next step, for intensification, i.e. increasing the degree of beryllium extraction from bertrandite-phenakite concentrate, a less toxic, easily accessible, cheap reagent, ammonium fluoride (NH4F), was used. The concentration of ammonium fluoride was varied from 1 to 8%, leaving the concentration and volume of hydrochloric acid and extraction conditions unchanged. It should be noted that HCl is the only required reagent in the leaching solution, however the addition of NH4F increases the degree of extraction of beryllium. It should further be noted that the solution contains absolutely no sulfuric acid, no nitric acid, and no potassium chloride, as such reagents limit the degree of beryllium extraction. The various beryllium minerals (depending on the type of mineral) may contain impurities comprising calcium, barium, magnesium, and other atoms. If the solution contains sulfuric acid, it forms sparingly soluble sulfates of calcium, barium, magnesium, etc., which are deposited on the mineral surface. Such deposits lead to difficulty of access by the solvent-hydrochloric acid, which in turn leads to a reduction in the amount of beryllium extracted. The same is true for nitric acid. Moreover, the harmful gas of NO2 is released as a result. The same is also true for potassium chloride.

The technique for extracting bertrandite-phenakite beryllium concentrate: 500 mL of cold solution (25° C.) of hydrochloric acid HCl:H2O=1:1 was poured over 25 g and 10 g weighed portions and 1-8 g of ammonium fluoride (NH4F) was added and gradually heated on a plate for 10 hours at a temperature of 25° C. to 80° C.

Since a single administration of solvent reagent (NH4F) ammonium fluoride in hydrochloric acid medium does not provide high beryllium extraction, additional experiments were performed with portioned introduction of ammonium fluoride of 2 g every 2 hours, which, as proposed, allows maintaining a greater concentration of ammonium fluoride for a duration of 10 hours with gradual heating from 25° C. to 80° C.

Next, the reaction mixture is cooled and filtered. The filtrate is retained for settling of beryllium ions. Part of the solution (in 15 mL volumes of each of the 4 replicated tests) was sent out to determine its content of beryllium that has changed from solid phase into a solution. This showed that portioned introduction of ammonium fluoride into a 1:1 hydrochloric acid medium while maintaining a specified solution acidity is more effective than a one-time addition. Extraction of beryllium that has changed from the solid phase into a solution was 93-94% under these conditions.

For burden balance calculations, the precipitate was dried after extraction from bertrandite-phenakite concentrate using a 1:1 hydrochloric acid solution in the presence of 8 g NH4F (ammonium fluoride) (fractional method) with heating from 25° C. to 80° C. for 10 hours. Then 1 g of precipitate was fused with Na2CO3+K2CO3 in a platinum crucible. The alloy was cooled and transferred to the solution. Beryllium content was determined. The beryllium content found in the precipitate ranged from 1.9 to 4.03%. It was factually confirmed that the degree of beryllium extraction from the solution actually corresponds to 93-94%. The aforementioned data were obtained in the laboratory of elemental analysis at the Institute for Nuclear Physics (Alatau, Almaty) using the methods of mass-spectrometry and inductively coupled plasma.

The degree of beryllium extraction from the stated bertrandite-phenakite concentrate sharply increased to 93-94%. This is due to the fact that, when using potassium bifluoride, a highly viscous medium is formed, which hinders the mobility of beryllium ions, and leads in turn to inhibition of the beryllium mineral dissolution process. At the same time, in the presence of ammonium fluoride, this does not occur. Furthermore, as mentioned above, using a hot solution creates a large quantity of silicic acid, which inhibits the dissolution of beryllium minerals by blocking their surfaces.

Table 4—Results of beryllium extraction from bertrandite-phenakite concentrate using an ammonium fluoride dissolution reagent in the range of 1-8% concentration by mass (NH4F). Weighed portion of 25 g concentrate. Solution volume of 500 mL Hydrochloric acid 1:1 with continuous heating for 8 hours at temperatures from 25° C. to 80° C. Initial Be concentrate content of 4.18%.

TABLE 4

| Concentration of ammonium fluoride, in % by mass | Degree of Be extraction, % |
|---|---|
| 1 | 90.5; 91.0; 91.3; 91.2; 90.5 |
| 2.5 | 90.8; 90.6; 91.5 |
| 5 | 91.0; 91.3; 91.5; 91.0; 91.1; 91.8 |
| 8 | 93.0; 93.5; 93.6; 93.8; 94.0; 94.1 |

Thus, the most economically and environmentally beneficial and effective dissolving reagent for extracting beryllium from bertrandite-phenakite concentrate is that according to invention claims 1 and 2. It should be noted that under conditions of dissolving bertrandite and phenakite all beryllium minerals are dissolved, except beryllium.

Gradual heating of hydrochloric acid solution HCl: $H_2O=1:1$ for 8 hours from 25° C. to 80° C. Beryllium extraction is 90-91%.

Using an 8% solution (by mass) of ammonium fluoride (fractional method) in the same 1:1 hydrochloric acid solution with successive (i.e. gradual) heating for 10 hours from 25° C. to 80° C. Beryllium extraction is 93-94%.

Fractional Method. The ground ore (i.e. bertranditefenakite concentrate) beryllium minerals are immersed in a hydrochloric acid solution (with a given percentage of hydrochloric acid and totaling 12% by volume). With the addition of ammonium fluoride in a fractional manner, the solution is gradually heated from room temperature to 80° C. over a period of eight (8) hours. The required amount of ammonium fluoride (up to amount of 8% ammonium fluoride by weight of the ore) may be added several times during the process in fractional doses, and is divided into equal parts (in this example—4 equal portions), wherein each portion of ammonium fluoride is added after a given period of time (in this example—every two hours).

The use of such a fractional method ensures that the concentration of the solubilizing agent (i.e., fluorine ions, which are materialized through the bonding of hydrochloric acid and ammonium fluoride) is at an optimal level, such that the extraction of beryllium from its minerals can be maximized. In the case of a single non-fractional administration of a dissolving agent, the reactant concentration exists in excess, and excess reagent reactions occur not only with the beryllium in the solution, but also with aluminum, iron, and any other metal atoms leaching from the concentrate. This factor reduces the yield of beryllium, for at least 2 reasons: (1) firstly, due to the fact that part of the dissolving agent interacts with atoms other than beryllium, the residual concentration of the solubilizing agent is not sufficient for a complete extraction of beryllium from the mineral, and (2) secondly, some products of the reaction between the dissolving agent and the metal atoms of the ore will be insoluble; these insoluble products are deposited on the mineral surface and thereby block access between the dissolving agent and the beryllium.

In contrast to a single non-fractional administration of ammonium fluoride, the use of a fractional method (i.e., adding fresh portions of solubilizing agent at regular intervals during the leaching process, e.g., every two hours) increases the efficiency of extraction of beryllium in dissolved form, due to the maintaining of an optimal concentration of the reactant during and throughout the entire leaching process. Since the method does not allow for excess dissolving agent to be present in the solution at any given time, that excess dissolving agent is not spent on other atoms (i.e. minerals others than those desired) and the method thus provides for the most complete and optimal extraction of beryllium without exhausting the excess dissolving agent on other minerals also present in the ore or concentrate.

Gradual Temperature Increase. The gradual increase in temperature employed by the present invention is also necessary to eliminate secondary processes, which prevent optimal extraction of beryllium minerals. If, during mineral processing, a hot solution is used to dissolve the reagent, the presence of silica minerals in the concentrate leads to the formation of silicic acid, which slows down the rate of beryllium dissolution. This is due to the fact that, on the surface of the mineral, a viscous medium forms from the buildup of silicic acid. This formed viscous medium hinders the mobility of metal ions which have passed from a solid phase into the solution, and a larger buildup could completely block the passage of such ions, if at a sufficiently high concentration. Gradually heating the reaction mixture from 25° C. to the required temperature (e.g., 55-80° C.) avoids such blockage and allows for removal of the majority of the beryllium before any such blockage could potentially occur (i.e., before the formation of silicic acid begin to affect the extraction process). The temperature is preferably raised from 25° to 70-80° C. and is done so gradually (i.e., smoothly, with no "steps" or jumps in temperature). The temperature may be gradually increased to a maximum of 70° C., for example, but the lower maximum temperature increases processing time. For example, if heating to 80° C., a maximal extraction of beryllium is achieved at 8 hours, while if heating to 70° C., the same result takes 10 hours.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for leaching beryllium from a beryllium-containing concentrate or a beryllium-containing ore, comprising:
    contacting the concentrate or the ore with a leaching solution, said leaching solution containing a technical grade hydrochloric acid in an amount from 0.2-12% HCl, said solution containing no sulfuric acid, no nitric acid, and no potassium chlorate, and
    extracting beryllium via a heating for 8 hours from 25° to 80° C., and
    adding ammonium fluoride to the leaching solution in contact with the concentrate or ore, wherein said ammonium fluoride is added in three or more doses, each dose being administered at least two hours apart.

2. The method of claim 1, wherein said heating step comprises heating to a temperature of 55 degrees Celsius.

3. A method for dissolving a bertrandite-phenakite concentrate or a bertrandite-phenakite ore, comprising:
    processing the concentrate or ore with a solvent,
    filtrating and washing the concentrate or ore, and
    heating the concentrate or ore with a solvent for 10 hours from 25° C. to 80° C.,
    wherein the solvent comprises 12% by mass of hydrochloric acid in a presence of ammonium fluoride, said ammonium fluoride being added to a concentration of 8% solution by mass, said ammonium fluoride being added in at least three portions, each portion being added every 2 or more hours.

4. The method of claim 1, wherein said ammonium fluoride is added to said leaching solution in four equal doses.

5. The method of claim 1, wherein said ammonium fluoride is added to said leaching solution in equal doses.

6. The method of claim 1, wherein said ammonium fluoride is added to said leaching solution in equal doses.

7. The method of claim 4, wherein a first dose of said ammonium fluoride is added to said leaching solution immediately and once every 2 hours thereafter.

8. The method of claim 1, wherein 2 grams of said ammonium fluoride are added to the leaching solution once every 2 hours, wherein a first dose of said ammonium fluoride is added immediately.

9. The method of claim 1, wherein a fresh portion of ammonium fluoride is added every 2 hours, forming the following amounts of total ammonium fluoride in percent by mass added to said leaching solution: 1 weight percent at 0 hours, 2.5 weight percent at 2 hours, 5 weight percent at 4 hours, and 8 weight percent at 6 hours.

* * * * *